United States Patent
Martin et al.

(10) Patent No.: US 6,633,812 B1
(45) Date of Patent: Oct. 14, 2003

(54) METHOD FOR INFLUENCING SOURCE DATA FOR DETERMINING A ROUTE IN A NAVIGATION SYSTEM

(75) Inventors: Jan Martin, Hildesheim (DE); Uwe Walkling, Barfelde (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/720,370

(22) PCT Filed: Apr. 23, 1999

(86) PCT No.: PCT/DE99/01221
§ 371 (c)(1),
(2), (4) Date: Feb. 23, 2001

(87) PCT Pub. No.: WO00/02010
PCT Pub. Date: Jan. 13, 2000

(30) Foreign Application Priority Data

Jul. 2, 1998 (DE) .......................... 198 29 538

(51) Int. Cl.$^7$ ............................... G01C 21/30
(52) U.S. Cl. ................... 701/209; 701/210; 701/25; 701/26
(58) Field of Search ................ 701/209, 201, 701/202, 205, 208, 24, 25, 26, 210

(56) References Cited

U.S. PATENT DOCUMENTS

| | | | | |
|---|---|---|---|---|
| 4,937,753 A | * | 6/1990 | Yamada ....................... | 701/209 |
| 5,561,790 A | * | 10/1996 | Fusaro ........................ | 395/500 |
| 5,845,228 A | * | 12/1998 | Uekawa et al. ............. | 701/209 |
| 6,192,312 B1 | * | 2/2001 | Hummelsheim ............ | 701/118 |
| 6,230,099 B1 | * | 5/2001 | Fabian ........................ | 701/209 |
| 6,385,531 B2 | * | 5/2002 | Bates et al. ................. | 340/992 |

FOREIGN PATENT DOCUMENTS

| | | |
|---|---|---|
| EP | 0 702 210 | 3/1996 |
| EP | 0782 120 | 7/1997 |

* cited by examiner

Primary Examiner—William A. Cuchlinski, Jr.
Assistant Examiner—Olga Hernandez
(74) Attorney, Agent, or Firm—Kenyon & Kenyon

(57) ABSTRACT

A method for manipulating source data to determine a route from a predetermined starting point to a predetermined destination for a means of conveyance, in particular for a motor vehicle, airplane or ship, based on a digital database that includes predetermined route segments $k_i$ with correspondingly assigned nodes $n_i$ that interconnect respective route segments $k_i$, where respective weights $g_i$ are assigned to the route segments $k_i$ and/or the nodes $n_i$. The weights $g_i$ are varied, as a function of external events, before a route finding algorithm determines the route.

13 Claims, 4 Drawing Sheets

| TRAFFIC EVENT | C EVENT CLASS | ΔV VARIATION IN EDGE VELOCITY TO |
|---|---|---|
| BLOCKED | 1 | → 0 PERCENT |
| TRAFFIC JAM | 2 | 20 PERCENT |
| STOP-AND-GO TRAFFIC | 3 | 40 PERCENT |
| DENSE TRAFFIC | 4 | 60 PERCENT |
| LIGHT TRAFFIC | 5 | 90 PERCENT |
| DISTURBANCE-FREE TRAFFIC | 6 | 100 PERCENT |

| EDGE | EDGE WEIGHT (LENGTH OF EDGE IN METERS) |
|---|---|
| k1 | 45 |
| k2 | 35 |
| k3 | 45 |
| k4 | 35 |
| k5 | 45 |
| k6 | 200 |
| k7 | 85 |
| k8 | 92 |
| k9 | 120 |
| k10 | 45 |

| TRAFFIC EVENT | C EVENT CLASS | ΔV VARIATION IN EDGE VELOCITY TO |
|---|---|---|
| BLOCKED | 1 | → 0 PERCENT |
| TRAFFIC JAM | 2 | 20 PERCENT |
| STOP-AND-GO TRAFFIC | 3 | 40 PERCENT |
| DENSE TRAFFIC | 4 | 60 PERCENT |
| LIGHT TRAFFIC | 5 | 90 PERCENT |
| DISTURBANCE-FREE TRAFFIC | 6 | 100 PERCENT |

METHOD FOR INFLUENCING SOURCE DATA FOR DETERMINING A ROUTE IN A NAVIGATION SYSTEM

This application is a 371 of PCT/DE99/01221 Apr. 23, 1999.

FIELD OF THE INVENTION

The present invention relates to a method for manipulating source data to determine a route from a predetermined starting point to a predetermined destination for a means of conveyance, in particular for a motor vehicle, airplane, or ship, based on a digital database that includes predetermined route segments $k_i$ with correspondingly assigned nodes $n_i$ that interconnect predetermined route segments $k_i$, where respective weights $g_i$ are assigned to the route segments $k_i$ and/or the nodes $n_i$.

BACKGROUND INFORMATION

Navigation systems, such as those based on GPS (Global Positioning System), help the driver of a means of conveyance to navigate a route to a predetermined destination. The navigation system selects an optimum path, i.e., route, at least on the basis of starting and destination coordinates and a corresponding digital database that is largely a representation of the real road grid. However, when a navigation system determines routes autonomously, existing navigation systems are partly or entirely unable to take into account real traffic events, such as traffic jams in a specific route segment.

SUMMARY OF THE INVENTION

The object of the present invention is to provide an improved method of the type mentioned in the preamble which eliminates the above-mentioned disadvantages and suitably converts the effects of such traffic events in a real traffic situation to a digital map.

According to the present invention, this is accomplished in that weights $g_i$ are varied, as a function of external events, before a route finding algorithm determines the route.

The advantage of this is that, particularly when determining an optimum route using a route finding algorithm, the alternative routes obtained after manipulating the existing digital map pay particularly close attention to the underlying, real traffic situation.

To achieve optimum routing, the route finding algorithm determines the route in a way that minimizes the sum of weights $g_i$.

In one preferred embodiment of the method, weight $g_i$ is a length $l_i$ of a route segment $k_i$, a travel time $t_{ki}$ of a route segment $k_i$, and/or a waiting time $t_{ni}$ at a node $n_i$. A node can be, for example, a border crossing or a tollgate, and the waiting time refers to the respective processing time.

A data source suitably supplies data to vary weights $g_i$ that are processed in a data sink. The data source can be, for example, a traffic report receiver, an event data bank, and/or a data bank for mapping traffic reports to the database, and the data sink can be, for example, a traffic report data-processing software program in a navigation computer of the navigation system.

To vary the weights according to events, the external events are classified for predetermined weight variations by the data source and/or the data sink.

In one preferred embodiment, weight $g_i$ is a travel time $t_{ki}$ of route segment $k_i$, where a varied weight $t_{ki}^{new}$ is obtained according to the following equation:

$$t_{k_i}^{new} = \frac{l_{k_i}}{V(k_i)} \cdot \frac{100}{\Delta V_c},$$

where $V(k_i)$ is an assumed velocity for route segment $k_i$, and $DV_c$ is a variation in route segment velocity caused by an external event.

In an alternative, preferred embodiment, weight $g_i$ is a travel time $t_{ki}$ of route segment $k_i$, where the database has a hierarchical layout, and a varied weight $t_{ki}^{new}$ is obtained according to the following equation:

$$t_{k_i}^{new} = t_{k_i}^{new(1)} - t_{k_i}^{new(2)} = \left( \frac{l_{k_i}}{V(k_i)} \cdot \frac{100}{\Delta V_c} \cdot \frac{\Delta l_{levelj}}{100} \right) + \left( \frac{l_{k_i}}{V(k_i)} \cdot \left(1 - \frac{\Delta l_{levelj}}{100}\right) \right)$$

where $V(k_i)$ is an assumed velocity for route segment $k_i$, $DV_c$ is a variation in route segment velocity caused by an external event, and $D|_{Level\ j}$ is the length percentage of overall edge length designating the proportionate manipulation on a generalization level j of the hierarchical database.

DETAILED DESCRIPTION

To explain how the method according to the present invention works, the mapping of the real road grid by a digital database, i.e., map, and its implementation by a route finding algorithm are described in greater detail below with reference to FIGS. 1 through 4.

Figures 1, 2:
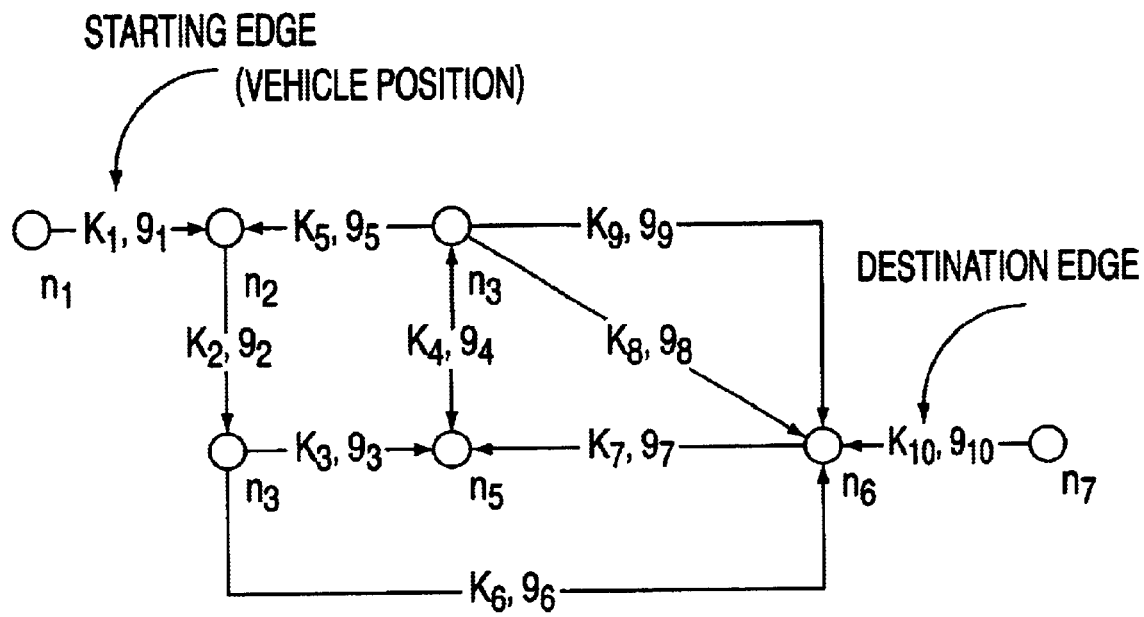
FIG. 1 shows a schematic representation of a digital database for mapping a real road grid.
FIG. 2 shows a table containing the assignments of route segments, i.e., edges, and segment or edge weights of the digital database.

The mapping of a real road grid by a digital map can take the form illustrated, for example, in FIG. 1. The road grid is thus simplified mathematically and represented by a bipartite graph. On this graph, roadways are represented by directional route segments or edges ($k_i$). Nodes ($n_i$) describe the interconnections between street elements (intersections, highway junctions, etc.). These properties make it possible to generate path descriptions for a network of this type. With reference to the edge names and directions (edge vectors), a path is clearly described in the form of an edge list, starting from a defined start element and ending with a specified destination element.

If we assign certain attributes (edge weights) to the network edges, an algorithmic method can be applied to a network of this kind to determine an optimum route from one current vehicle position (starting edge) to a desired destination (destination edge). A great variety of weights can be assigned to the edges. The fact that the weight applied by the algorithm can be derived from all edges in a database is of utmost importance for the algorithm. Methods that achieve this object include optimized algorithms, such as those according to Ford or Moore. In the simplest case, we can, for example, assign an edge whose own length is shown in the table according to FIG. 2 as an edge weight.

We next apply a specified route finding algorithm to a network of this type, the goal of which is to determine an edge selection so that the following statement applies to the located selection: "The sum of all applied edge weights is the smallest of all other selectable edges leading from the starting edge to the destination edge." This method thus selects the shortest possible connection between the starting and destination edges, which is as follows for the example in FIG. 1:

k1→-k5→k8→-k10

Here, the signs indicate the travel direction for the predetermined edge vector (positive sign: same direction as the vector; negative sign: opposite direction from the vector).

Figure 3:
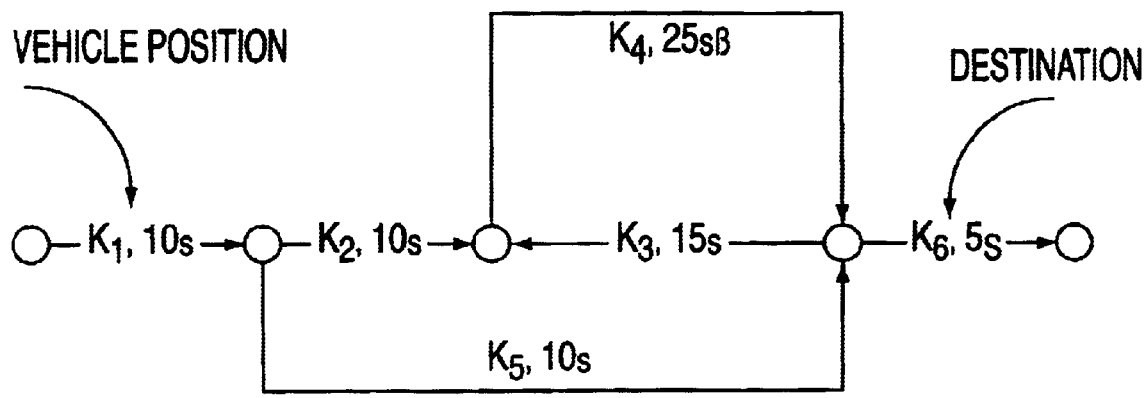
FIG. 3 shows a sample route for a motor vehicle based on the digital database, where travel times are assigned as edge weights.

In assigning attributes to edges, other interpretations can also be used as weights. To determine the optimum path in relation to travel time, for example, we can assign travel times as weights to the edges. These are obtained from the corresponding edge length as well as from an assumed vehicle velocity on the segment elements (FIG. 3). For the example in FIG. 3, the route finding algorithm applied above would a determine the optimum route $k_1$→-k5→k6 with a minimum total travel time of 25 seconds.

Figure 4:
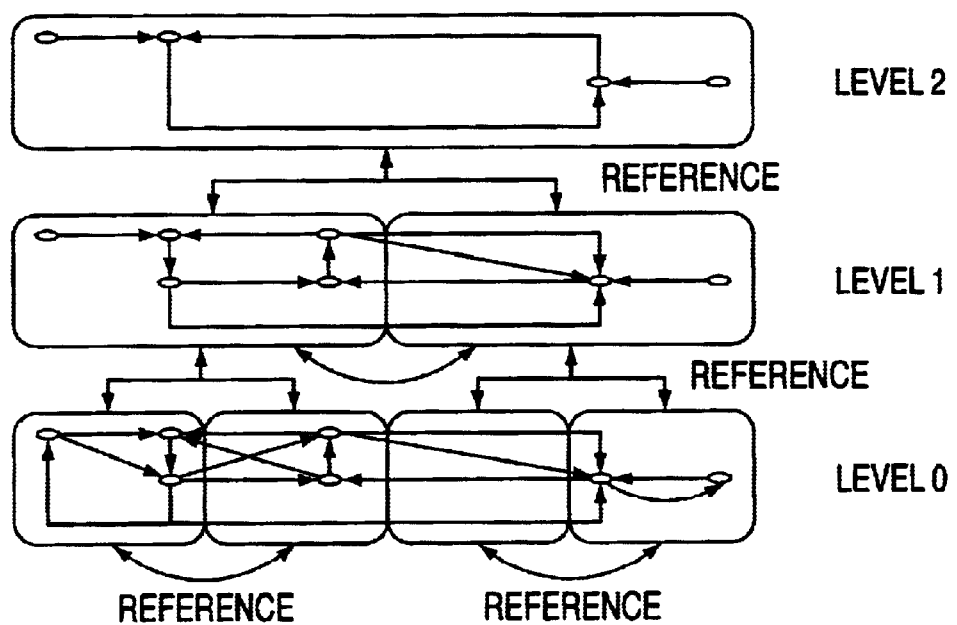
FIG. 4 shows a schematic representation of a hierarchical digital database layout.

The layout of a digital map, i.e., database, is explained in greater detail below on the basis of FIG. 4. The overall scope of a digital database, and the performance of autonomous navigation systems limited by the processor technology, generally means that a database of this type (i.e., Germany) cannot be used in its entirety by a route finding algorithm, but instead must be suitably divided into various regions. This division can be accomplished on multiple levels which describe the road grid in different resolutions (FIG. 4). Each level, in turn, includes one or more subregions. An important characteristic of such subregions is that they cannot exceed a certain magnitude in terms of number of graph elements. Thus, levels displaying the road grid in a higher resolution contain correspondingly more subregions.

We can imagine the layout and use of a hierarchical digital database much like an atlas map. The area covered by the database is divided into subregions on individual pages at maximum resolution. References to adjacent pages establish the relationships between the pages. However, a user or an algorithmic method can generally only work with either one page or a limited number of pages at a time. Further generalized representations in the form of overview maps (generalized levels of a digital database) are necessary to determine routes over greater distances.

The method according to the present invention makes it possible to suitably vary the weighting of individual elements in the graph (i.e., database) described above as a function of traffic events. It is immaterial in this case whether the weighting to be manipulated is represented as edge and/or node weights on the graph. The edge weighting is described below by way of an example without limiting the present invention. The edge weights vary, for example, when traffic elements are processed. Any other possible effect that can be mapped onto the edge weights can also be processed with this method.

All data needed to produce a consistent weight variation is completely supplied by at least one data source. A data sink combines the data supplied by the data source with the data in the database. A data source can be, for example, a traffic report receiver, an event data bank, and/or a data bank for mapping traffic reports to the database, where the method for determining the database elements to be manipulated is independent of the method according to the present invention. The data sink can be, for example, a traffic report data-processing software program in a navigation computer of the navigation system.

To vary the weight of a graph element, a declaration about the form of weight variation is provided between the weight variation source and the processing sink. This declaration can be, for example, an event classification. In this case, the receiver identifies the traffic report according to a defined rule. Defined weight variations are assigned to the identifiers in the navigation system. However, the method according to the present invention also enables the weight variations to be defined by the reports themselves. In this instance, the traffic report sender specifies the weight variations. The navigation system thus does not store any weight variation data.

To apply the method, all relevant events are categorized into different event classes. One event class corresponds, for example, to a certain effect on the assumed velocity, which is assigned to each edge element on the digital map, as shown for example in FIG. 5.

A calculation equation for weighting an edge with travel time attributes is described in greater detail below as a particular embodiment. To determine the optimum path with regard to the travel time needed between a starting edge and a destination edge, travel times are assigned as weights to the edges, like the assignment illustrated in FIG. 2. Travel time $t_{ki}$ of one edge is derived from edge length $l_{ki}$ and assumed travel velocity $V(k_i)$ for this segment element:

$$t_{k_i} = \frac{l_{k_i}}{V(k_i)} \quad (I)$$

Function $V(k_i)$ in this case assigns a velocity to present edge element i as a function of specific edge attributes (such as functional road class, regional assignment, etc.).

The velocity manipulates the edge weighting as follows. A classified traffic event manipulates an edge element $k_i$ by linearly varying its assumed velocity $V(k_i)$:

$$t_{k_i}^{new} = \frac{l_{k_i}}{V(k_i)} \cdot \frac{100}{\Delta V_c} \quad (II)$$

In this case, $DV_c$ is a velocity variation caused by the external event on the edge, i.e., route segment $k_i$. In the present overall network, all other edge elements thus appear more "attractive" to a route finding algorithm than the manipulated element. If we apply this algorithm to a manipulated network, the edge elements are evaluated according to their new weighting and, after suitably manipulating individual elements, an alternative edge sequence, i.e., detour or alternative route, is determined in comparison to the one yielded by conventional methods.

In the sample network illustrated in FIG. 3, a route finding algorithm would determine an edge sequence k1→-k5→-k6 with a total travel time of 25 seconds as an optimum sequence for the shorter distance in time between the starting and destination edges. When suitably manipulated, for example with a traffic jam at edge element k5, the edge weight of this element changes from 10 seconds to 50 seconds, as shown in FIG. 6:

$$t_{k_5}^{new} = \frac{l_{k_5}}{V(k_5)} \cdot \frac{1}{20\%} = 10s \cdot \frac{1}{20\%} = 50s \quad \text{(III)}$$

Figures 5, 6:
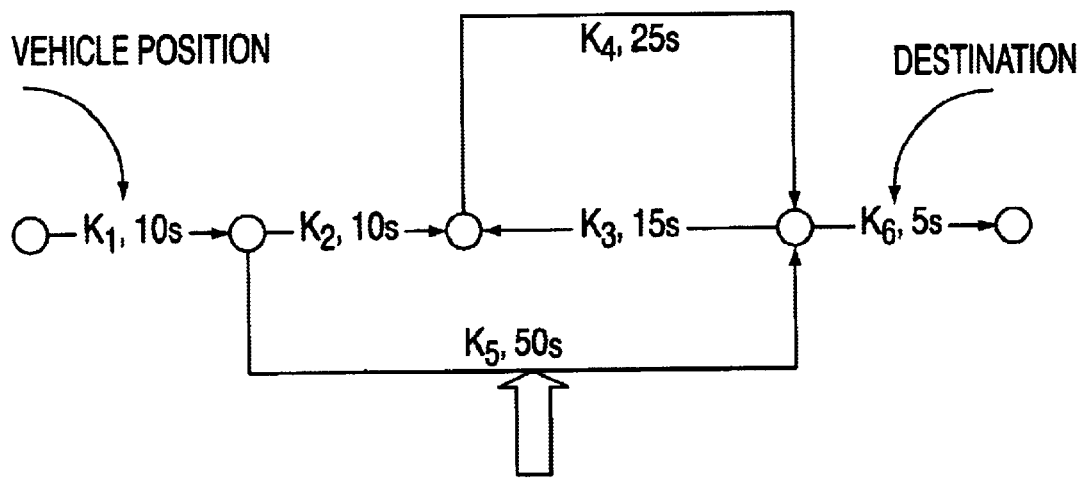
FIG. 5 shows a table containing the classification of traffic events.
FIG. 6 shows a sample route for a motor vehicle based on the digital database shown in FIG. 3, where the weights have been varied.

Recalculating the optimum distance in time yields an alternative edge sequence of k1→-k2→-k3→-k6, with an assumed total travel time of 30 seconds, as shown in FIG. 6.

A consistent edge weight variation is explained in greater detail below in a hierarchical data model. The method described above to manipulate edge weightings in relation to a classified traffic event initially varies edge weightings exclusively on a fixed network level. This manipulation thus takes place on only a single generalization level of the overall network (see FIG. 4, which illustrates a hierarchical layout of a digital database). Because a route selection algorithm must be able to use data from any generalization level, the edge weight configuration varied by an external network effect is suitably also carried out on all other levels of varying generalization. The changes made on a particular level are equivalent, i.e., consistent, on all other levels.

Figure 7:
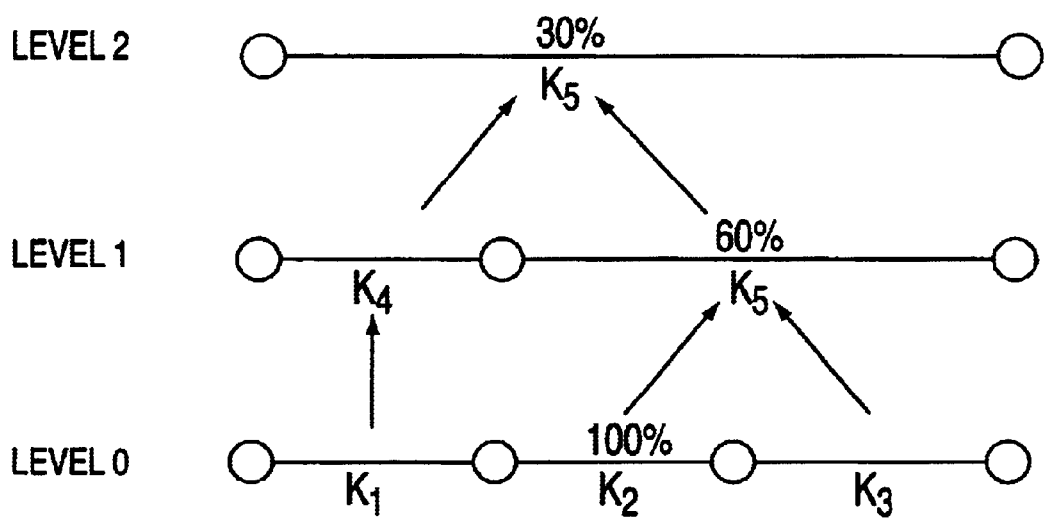
FIG. 7 shows a schematic representation of the consistent reproduction of varied weights from one generalization level to the next in a hierarchical database.

FIG. 7 shows a specific network segment on different generalization levels. The higher the number of the generalization level, the rougher the network resolution in this network representation of the digital map, i.e., database. The three edge elements shown in the example, $k_1$, $k_2$ and $k_3$ on the lowest generalization level are represented by individual edge element $k_5$ on the highest generalization level. If mapping a classified event (according to equation II) for edge element $k_2$ now produces a specific edge weight variation that loads 100 percent of the length of the element on this lowest generalization level, this manipulation should have an effect in proportion to length on higher levels only according to the present mapping rule (due to the generalization). Element $k_5$ on the next higher generalization level thus also represents non-manipulated element $k_3$ on level 0 so that, when varying the edge weighting on level 1, the variation may include only the corresponding length component for edge $k_2$.

An additional attribute assignment that describes the effected length component of the respective element as a function of the present generalization level is therefore necessary for edge elements to be manipulated. A corresponding factor is therefore suitably added to the edge weight variation rule described in equation (II):

$$t_{k_i}^{new} = t_{k_i}^{new(1)} - t_{k_i}^{new(2)} = \left( \frac{l_{k_i}}{V(k_i)} \cdot \frac{100}{\Delta V_c} \cdot \frac{\Delta l_{levelj}}{100} \right) + \left( \frac{l_{k_i}}{V(k_i)} \cdot \left(1 - \frac{\Delta l_{levelj}}{100}\right) \right)$$

where $D|_{Level\ j}$ is the length component as a percentage of overall edge length designating the proportionate manipulation on generalization level j.

The method according to the present invention thus provides a universal manipulation capability for a statically predefined edge and/or node weighting on a predefined digital map. Because the events to be taken into account have an effect (event class) on this weighting that can be defined independently of the database, a wide variety of manipulations are conceivable. For example, traffic events such as traffic jams or stop-and-go traffic can lead to a deterioration on certain route segments. An autonomous navigation system thus avoids a segment of this type when assigned a poor weighting (such as a traffic jam on the highway) and selects, for example, a better time alternative if it is possible, for example, to take a detour via smaller road segments.

Further options include, for example, fully blocking certain route segments in the specified network that correspond to a specific attribute assignment. For vehicles such as heavy freight trucks, a dynamic navigation system of this type could automatically block route segments which do not support a sufficient maximum vehicle weight. A correspondingly poor edge weighting can identify these segments as impassable for a route finding algorithm, causing the driver to avoid them according to the generated driving recommendations.

In addition, improvements to the edge weightings in the network are also conceivable to highlight certain routes, for example, and thus suitably manipulate certain routes suggested by the system.

The method ensures a consistent mapping of manipulations in a hierarchical data model. This eliminates the need to adapt current fundamental algorithms, such as for route finding and destination guidance, since an external manipulation is not discernable for these functions.

What is claimed is:

1. A method for manipulating source data to determine a route from a predetermined starting point to a predetermined destination for a conveyance means, comprising the steps of:

assigning weights ($g_i$) to predetermined route segments ($k_i$) and to corresponding nodes ($n_i$) included in a digital database, the nodes ($n_i$) interconnecting respective route segments ($k_i$);

varying the weights ($g_i$) as a function of external events; and determining a route using a route finding algorithm, the algorithm taking the weights ($g_i$) into account.

2. The method according to claim 1, wherein the conveyance means is a motor vehicle.

3. The method according to claim 1, further comprising the steps of:

supplying data from a data source; and processing the data in a data sink.

4. The method according to claim 3, wherein the data sink is a traffic report data-processing software program in a navigation computer of a navigation system.

5. A method for manipulating source data to determine a route from a predetermined starting point to a predetermined destination for a conveyance means, comprising the steps of:

assigning weights ($g_i$) to predetermined route segments ($k_i$) and to corresponding nodes ($n_i$) included in a digital database, the nodes ($n_i$) interconnecting respective route segments ($k_i$);

varying the weights ($g_i$) as a function of external events; and determining a route using a route finding algorithm, the algorithm taking the weights ($g_i$) into account and in a manner that minimizes a sum of weights ($g_i$).

6. A method for manipulating source data to determine a route from a predetermined starting point to a predetermined destination for a conveyance means, comprising the steps of:

assigning weights ($g_i$) to predetermined route segments ($k_i$) and to corresponding nodes ($n_i$) included in a digital database, the nodes ($n_i$) interconnecting respective route segments ($k_i$), wherein the weights ($g_i$) assigned to nodes ($n_i$) are waiting times at the respective nodes;

varying the weights ($g_i$) as a function of external events; and determining a route using a route finding algorithm, the algorithm taking the weights ($g_i$) into account.

7. A method for manipulating source data to determine a route from a predetermined starting point to a predetermined destination for a conveyance means, comprising the steps of:

assigning weights ($g_i$) to predetermined route segments ($k_i$) and to corresponding nodes ($n_i$) included in a digital database, the nodes ($n_i$) interconnecting respective route segments ($k_i$);

varying the weights ($g_i$) as a function of external events;

determining a route using a route finding algorithm, the algorithm taking the weights ($g_i$) into account;

supplying data from a data source, wherein the data source is at least one of a traffic report receiver, an event data bank and a data bank for mapping traffic reports to the database; and processing the data in a data sink.

8. A method for manipulating source data to determine a route from a predetermined starting point to a predetermined destination for a conveyance means, comprising the steps of:

assigning weights ($g_i$) to predetermined route segments ($k_i$) and to corresponding nodes ($n_i$) included in a digital database, the nodes ($n_i$) interconnecting respective route segments ($k_i$);

varying the weights ($g_i$) as a function of external events;

determining a route using a route finding algorithm, the algorithm taking the weights ($g_i$) into account;

supplying data from a data source;

processing the data in a data sink; and classifying the external events for predetermined weight variations, by at least one of the data source and the data sink.

9. A method for manipulating source data to determine a route from a predetermined starting point to a predetermined destination for a conveyance means, comprising the steps of:

assigning weights ($g_i$) to predetermined route segments ($k_i$) and to corresponding nodes ($n_i$) included in a digital database, the nodes ($n_i$) interconnecting respective route segments ($k_i$);

varying the weights ($g_i$) as a function of external events;

determining a route using a route finding algorithm, the algorithm taking the weights ($g_i$) into account; and obtaining a varied weight $t_{ki}^{new}$ according to the following equation:

$$t_{ki}^{new} = \frac{l_{k_i}}{V(k_i)} \cdot \frac{100}{\Delta V_c},$$

wherein each respective weight $g_i$ is a travel time $t_{ki}$ of the route segment $k_i$, $V(k_i)$ is an assumed velocity for the route segment $k_i$, and $\Delta V_c$ is a variation in route segment velocity caused by an external event.

10. A method for manipulating source data to determine a route from a predetermined starting point to a predetermined destination for a conveyance means, comprising the steps of:

assigning weights ($g_i$) to predetermined route segments ($k_i$) and to corresponding nodes ($n_i$) included in a digital database, the nodes ($n_i$) interconnecting respective route segments ($k_i$);

varying the weights ($g_i$) as a function of external events;

determining a route using a route finding algorithm, the algorithm taking the weights ($g_i$) into account; and obtaining a varied weight $t_{ki}^{new}$ according to the following equation:

$$t_{k_i}^{new} = t_{k_i}^{new(1)} - t_{k_i}^{new(2)} = \left( \frac{l_{k_i}}{V(k_i)} \cdot \frac{100}{\Delta V_c} \cdot \frac{\Delta l_{levelj}}{100} \right) + \left( \frac{l_{k_i}}{V(k_i)} \cdot \left( 1 - \frac{\Delta l_{levelj}}{100} \right) \right)$$

wherein the weight $g_i$ is a travel time $t_{ki}$ of the route segment $k_i$, where the database has a hierarchical layout, $V(k_i)$ is an assumed velocity for the route segment $k_i$, $\Delta V_c$ is a variation in route segment velocity caused by an external event, and $\Delta l_{levelj}$ is a length. percentage of overall edge length designating a proportionate manipulation on a generalization level j of the hierarchical database.

11. A method for manipulating source data to determine a route from a predetermined starting point to a predetermined destination for a conveyance means, comprising the steps of:

assigning weights ($g_i$) to predetermined route segments ($k_i$) or to corresponding nodes ($n_i$) included in a digital database, the nodes ($n_i$) interconnecting respective route segments ($k_i$);

varying the weights ($g_i$) as a function of external events; and determining a route using a route finding algorithm, the algorithm taking the weights ($g_i$) into account.

12. The method according to claim 11, wherein the algorithm takes the weights ($g_i$) into account in a manner than minimizes a sum of weights ($g_i$).

13. The method according to claim 11, wherein the weights ($g_i$) assigned to nodes ($n_i$) are waiting times at the respective nodes.

* * * * *